United States Patent [19]

Maslowski et al.

[11] 4,070,118
[45] Jan. 24, 1978

[54] METHOD AND AN ARRANGEMENT FOR FAULT LOCATION IN A GLASS FIBRE OPTICAL WAVEGUIDE

[75] Inventors: Stefan Maslowski, Aufheim; Oskar Krumpholz, Ulm, Danube, both of Germany

[73] Assignee: Licentia Patent-Verwaltungs-G.m.b.H., Frankfurt am Main, Germany

[21] Appl. No.: 637,745

[22] Filed: Dec. 4, 1975

[30] Foreign Application Priority Data

Dec. 7, 1974 Germany .............................. 2457930

[51] Int. Cl.² ...................... G01N 21/16; G01N 21/32
[52] U.S. Cl. .................................... 356/237; 250/572; 356/239
[58] Field of Search ................ 356/237, 239; 250/227, 250/562, 572

[56] References Cited

U.S. PATENT DOCUMENTS 3,884,585  5/1975  Leoduska ............................ 356/239
3,952,265  4/1976  Hunsperger .................... 331/94.5 H
3,981,592  9/1976  Williams .............................. 356/237

OTHER PUBLICATIONS

"A Laser . . . Mixer-Oscillator;" Judd; J. of Sci. Inst.; (Jour. of Physice E); 7-68; Rudd; p. 723.
Pinpointing Cable Faults; Allan; Post Office Telecommun. J. (GB) vol. 22, No. 4; 1970-1971; pp. 5-7.

*Primary Examiner*—Vincent P. McGraw
*Attorney, Agent, or Firm*—Spencer & Kaye

[57] ABSTRACT

A method of fault location in a glass fibre optical waveguide comprises using a laser device to provide pulses of light, feeding the light pulses into a glass fibre optical waveguide, feeding light pulses reflected from the fault in the glass fibre waveguide into the laser device in which their character is changed and determining the location of the fault from the known propagation time of the reflected pulses.

The invention also includes an arrangement for carrying out this method.

19 Claims, 2 Drawing Figures

METHOD AND AN ARRANGEMENT FOR FAULT LOCATION IN A GLASS FIBRE OPTICAL WAVEGUIDE

BACKGROUND OF THE INVENTION

The invention relates to a method of fault location in glass fibre optical waveguides. In the manufacture and laying of optical waveguide fibre cables breaks in the fibres cannot be completely eliminated. For this reason, methods are required for locating the position of faults as accurately as possible for the purpose of repair.

A widely known test method in cable technology is based on the fact that short electrical pulse signals are supplied into a cable end and the propagation time of the echo pulses is determined. With known pulse propagation time, the location of the fault or break point may be calculated from the measured propagation time.

SUMMARY OF THE INVENTION

It is an object of the invention to provide a method of fault location in glass fibre optical waveguides; which requires a particularly low investment in expensive measuring devices.

According to a first aspect of the invention, there is provided a method of fault location in glass fibre optical waveguides comprising producing light pulses by means of a laser device, passing said light pulses into a glass fibre waveguide with a fault, passing the light pulses reflected by said fault into the laser device to vary their character and determining the physical location of the fault from the known propagation time of the reflected pulses.

Further according to this aspect of the invention, there is provided a method of fault location in glass fibre optical waveguides according to the echo method known per se, in which short pulse signals are supplied into one end of a glass fibre, which signals are propagated in the glass fibre and are reflected at faults in the fibre, in which the position in space of the fault is determined from the known propagation time of the reflected signals, characterized in that a laser is used which, when operated as a light emitter, produces short light pulses for locating the faults and which after sending out the light pulses, when in double use as a light amplifier or as a light receiver, either amplifies the light signals reflected at faults or transforms them into electrical signals.

According to a second asepct of the invention there is provided an arrangement for fault location in glass fibres comprising a laser device for emitting light pulses and for receiving light pulses and varying their character, a light inlet/outlet surface for said laser device for feeding light pulses to the glass fibre and for receiving light pulses reflected from the fault in the glass fibre and means for determining from the varied character of the reflected light pulses the physical location of the fault from the known propagation time of the reflected pulses.

BRIEF DESCRIPTION OF THE DRAWINGS

The invention will now be described in greater detail, by way of example, with reference to the drawings, in which.

DESCRIPTION OF THE PREFERRED EMBODIMENTS

In a preferred form of the invention, starting from a method of fault location in glass fibre optical waveguides in which short pulse signals are supplied into one end of a glass fibre, which are propagated in the fibre and are reflected at faults in the fibre, in which from the known propagation time of the reflected signals the location in space of the fault is determined, it is proposed that a laser is used which, when operated as a light emitter, produces short light pulses for location of the faults and after sending out the light pulses is subsequently put into double use as a light amplifier or a light receiver which either amplifies or receives the light signals reflected at the faults.

Figure 1:
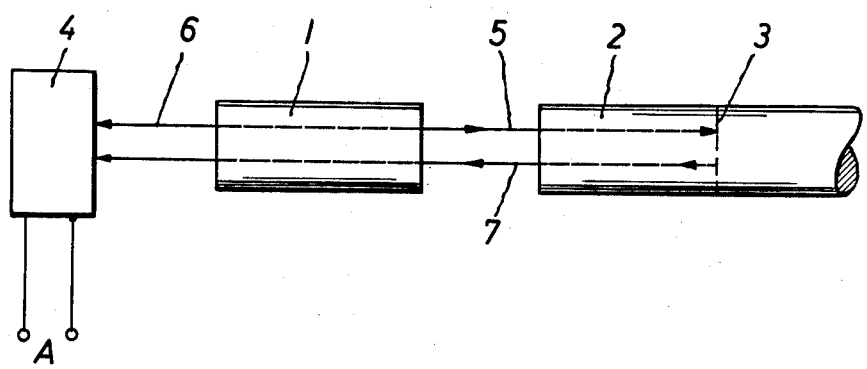
FIG. 1 shows diagrammatically an embodiment of the invention in which a laser device acts also as a light amplifier.

Referring now to the drawings, in FIG. 1, a section of a glass fibre optical waveguide is designated 2, which contains a fault indicated in broken lines at 3, for example a break point. A short, very high-output light pulse is coupled into the end of the fibre 2, said pulse being produced by a laser designated 1. The coupled light energy is reflected partially at the break point 3. The reflected light pulse which passes out of the end of the fibre 2 is designated 7 in FIG. 1. The time of arrival of the reflected light pulse is recorded and from this the path up to the point of reflection (fault) is calculated. The shorter the light pulse, the more exact the location of the fault. The output of the light pulse should be as high as possible, since the reflected portion at the fault may be very low. With a clean break in the fibre, the proportion of light reflected at the fault is a maximum of about 4%, if one assumes that the surface of the break is surrounded by air. Generally, however, the surface of the break is irregularly formed, whereby the reflected proportion of light may have considerably smaller values. The propagation time of the test pulse is determined advantageously in the following manner. When sending out the test pulse 5 by means of the laser 1, a light pulse 6 is simultaneously sent out in the opposite direction of propagation to pulse 5, said pulse 6 meets a light receiver 4 and an electrical signal is produced there, said signal being able to be tapped at the output terminals A of the light receiver 4. The test impulse 5 is reflected at the fault 3 in the fibre 2 and returns in the reverse direction of propagation as a light impulse designated 7. After passage through the laser 1, which acts, in double use, as an amplifier for the reflected light pulse 7, the reflected light pulse 7 also meets the light receiver 4 and produces a further electrical signal, which is available in turn at the output terminals A.

Both signals can either be made visible on an oscilloscope, not shown in FIG. 1, or can be recorded by a recording device. With the known propagation time of the light pulses in the fibre 2, the position of the fault 3 in the fibre 2 may be directly determined from the time delay in the output signals emitted by the light receiver 4. Generally, the propagation time of the light pulses through the laser 1 itself does not have to be taken into account.

An avalanche photodiode is used preferably as a light receiver 4, with which diode a considerable amplification may be achieved by a charge carried multiplication caused by a light impulse.

Preferably, a semiconductor laser is used as the laser 1; it carries a direct current lying only a little below the laser threshold and is caused to send out rays in the form of short light pulses solely with short current pulses, which exceed the threshold current intensity of the laser. After sending out a light pulse which is coupled on the one hand to the fibre as a test pulse 5, and on the other hand meets the light receiver 4 as a light pulse 6 for indicating the starting point in the time scale, the operating current of the semiconductor laser is again lowered below the value of the threshold current. The light pulse 7 reflected at the fault 3 in the fibre 2 thus passes to the laser 1 a little below the threshold. When passing the reflected light pulse 7 through the laser 1, no laser oscillation is excited; however, the light pulse experiences a considerable amplification. Only the signal pre-amplified optically in this way falls in the receiver 4 after passing through the laser and is recorded or registered in the previously described manner.

Instead of a semiconductor laser, an optically pumped solid-state laser may also be used, for example a neodymium laser. Such a crystal laser may be optically pumped by glow discharge lamps or by luminescence diodes. For producing a light pulse suitable as a test pulse, either an additionally provided glow discharge lamp may be ignited for a short time or else the luminescence diodes provided as pump light sources may be charged with a higher current for a short time.

Figure 2:
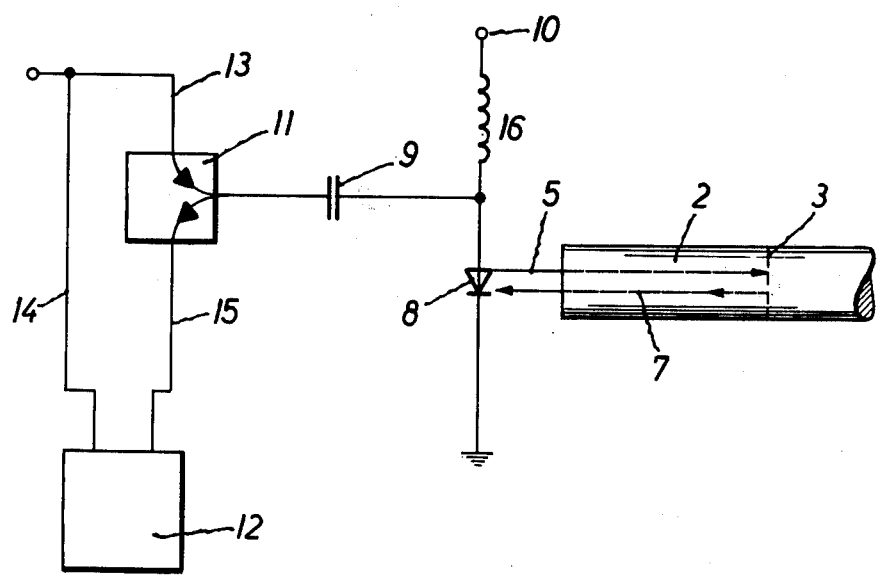
FIG. 2 shows diagrammatically an embodiment of the invention in which a laser device acts also as a light to electrical signal transducer.

A further considerable simplification of a method for fault location in glass fibres may be achieved in that the light receiver designated 4 in FIG. 1 is economized on, in that the laser 1 is dually operated both as a light emitter and as a light receiver for the reflected light pulse. This simplified method is illustrated in greater detail with reference to FIG. 2. A laser in the form of a semiconductor diode is designated 8, which may be caused, by a forward current pulse exceeding the threshold current, to send out a short light pulse 5. The current pulse is supplied to the semiconductor laser by means of the capacitor 9. The light pulse produced by the laser is coupled to the fibre 2 as a test pulse and there meets a fault designated 3. At this fault 3, it is reflected as light pulse 7. In the meantime, a reverse voltage has been applied to the semiconductor element 8 previously acting as a semiconductor laser by means of a connection 10. The semiconductor element 8 now acts as a light receiver and transforms the light pulse 7 reflected at the fault 3 into a corresponding electrical signal. By means of a capacitor designated 9 and a separating filter 11, the electrical signal triggered by the reflected light pulse 7 passes over a line 15 to an indicator device 12, for example an oscilloscope or a recording device. A mark for setting the starting point in the time scale was taken from the current pulse applied to the connection 13 by way of the line 14, which pulse had caused the semiconductor laser 8 to send out a light pulse 5. A filter 11 on the other hand ensures that the current pulse applied to the connection 13 reaches the semiconductor laser 8 and excites the latter to send out a light pulse, and on the one hand ensures that the electrical signal triggered by the reflected light pulse reaches the indicator or recording device 12.

The choke, 16 is so dimensioned that it blocks the current impulses for controlling the laser 8 and the signal impulses of the diode 8 acting as a photodiode on the one hand, but on the other hand it allows the passage of reverse voltage pulses at the terminal 10, which are substantially longer, with regard to time.

It will be understood that the above description of the present invention is susceptible to various modification changes and adaptations.

What is claimed is:

1. A method of fault location in glass fibre optical waveguides comprising producing light pulses by means of a laser device, passing said light pulses into a glass fibre with a fault, passing the light pulses reflected by said fault into the laser device to vary their character and determining the physical location of the fault from the known propagation time of the reflected pulses.

2. A method as defined in claim 1, and comprising amplifying said reflected light pulses by their passage through said laser.

3. A method as defined in claim 1, and comprising transducing said reflected light pulses into electrical signals by their passage through said laser.

4. An arrangement for fault location in glass fibre optical waveguides comprising a laser device for emitting light pulses and for receiving light pulses and varying their character, a light inlet/outlet surface for said laser device for feeding light pulses to the glass fibre and for receiving light pulses reflected from the fault in the glass fibre and means for determining from the varied character of the reflected light pulses the physical location of the fault from the known propagation time of the reflected pulses.

5. An arrangement as defined in claim 4, wherein said laser device comprises a device for producing laser light pulses and for amplifying light pulses received at said light inlet/outlet surface.

6. An arrangement as defined in claim 4, wherein said laser device comprises a device for producing laser light pulses and for transducing light pulses received at said light inlet/outlet surface into electrical signals.

7. A method for locating a fault which produces a reflection in a glass fiber optical waveguide, according to the echo pulse technique, said method comprising: operating a laser as a light emitter to produce a light pulse of short duration; delivering the light pulse to one end of a glass fiber optical waveguide containing such fault for causing the light pulse to be propagated therein and at least a portion of the light in the pulse to be reflected from the fault back to the one end thereof; operating the laser as a light amplifier subsequent to production of the light pulse for amplifying the reflected light emitted from the one end of the waveguide; and determining the position in space of the fault by observing the time between delivery of the light pulse to, and arrival of the resulting reflected light at, the one end of the waveguide and from the known propagation time of light in the waveguide.

8. A method as defined in claim 7 wherein the laser is a semiconductor laser which carries an operating current lying below the value of the threshold current, said step of operating the laser as a light emitter is carried out by raising the operating current above the threshold value only for a short time for sending out a light pulse, and said step of operating the laser as a light amplifier is carried out by lowering the operating current below the threshold value immediately after sending out a light pulse.

9. A method as defined in claim 7, wherein the laser is optically pumped solid-state laser.

10. A method as defined in claim 9 wherein the laser is a neodymium optically pumped laser.

11. A method as defined in claim 9, wherein the solid-state laser is initially excited only to below the threshold of the laser, and said step of operating the laser as a light emitter is carried out by means of an additional light source controlled in pulse form, to send out a light pulse.

12. A method as defined in claim 11, wherein the solid state laser is initially excited by continuously operated glow discharge light-sources.

13. A method as defined in claim 11, wherein the solid state laser is initially excited by continuously operated luminescence diodes.

14. A method as defined in claim 7 wherein said step of determining includes causing the laser to emit a further light pulse which sets the starting point in the time scale for measuring propagation time of the test pulse for the waveguide at the same time as the first-recited light pulse.

15. A method as defined in claim 7 wherein the laser has two opposed light outlet surfaces, said step of delivering is carried out by disposing the laser so that one of its light outlet surfaces faces the one end of the waveguide, and said step of determining includes operating an avalanche photodiode as a light receiver and disposing the photodiode as near as possible to the light outlet surface of the laser remote from the optical waveguide.

16. A method for locating a fault which produces a reflection in a glass fiber optical waveguide, according to the echo pulse technique, said method comprising: operating a laser as a light emitter to produce a light pulse of short duration; delivering the light pulse to one end of a glass fiber optical waveguide containing such fault for causing the light pulse to be propagated therein and at least a portion of the light in the pulse to be reflected from the fault back to the one end thereof; operating the laser as a light-to-electrical signal transducer subsequent to production of the light pulse for transforming the reflected light emitted from the one end of the waveguide into a corresponding electrical signal; and determining the position in space of the fault by observing the time between delivery of the light pulse to, and arrival of the resulting reflected light at, the one end of the waveguide and from the known propagation time of light in the waveguide.

17. A method as defined in claim 16 wherein the laser is a semiconductor element constructed in the form of a diode, said step of operating the laser as a light emitter is carried out by exciting the element to send out a light pulse by a current pulse applied in the forward direction of flow of the diode, the current impulse exceeding the value of the threshold current of the diode, and said step of operating the laser as a signal transducer is carried out by applying, after sending out the light pulse, a reverse voltage to the semiconductor element.

18. Apparatus for locating a fault which produces a reflection in a glass fiber optical waveguide, according to the echo pulse technique, comprising: a laser capable of operating selectively as a light emitter or a light amplifier and having two light outlet surfaces one of which is arranged to be disposed opposite one end of such a waveguide, said laser being arranged to first be operated as a light emitter to produce a light pulse of short duration and emit such pulse via both outlet surfaces, and to deliver such light pulse via the one outlet surface to the one waveguide end, and to immediately thereafter be operated as a light amplifier for amplifying light reflected back through the waveguide and emitted from the one waveguide end and for emitting such amplified light via the other of said light outlet surfaces; and light receiver means optically coupled to said other light outlet surface for receiving the light pulse emitted via said other surface when said laser operates as a light emitter and the amplified light emitted from said other surface when said laser operates as a light amplifier, said receiver means being arranged to provide an indication of the time lapse between emission of such light pulse and emission of amplified light resulting from reflection of the light of such pulse in the waveguide.

19. Apparatus for locating a fault which produces a reflection in a glass fiber optical waveguide, according to the echo pulse technique, comprising: a semiconductor element in the form of a semiconductor diode capable of operating selectively as a light emitter or a light-to-electrical signal transducer and having a light transmitting surface arranged to be disposed opposite one end of such a waveguide; means including a capacitor and directional filter connected to said diode for supplying thereto a current pulse for causing said diode to emit a light pulse of short duration via said light transmitting surface; means connected to said diode for applying thereto a reverse voltage immediately after production of such light pulse for causing said diode to transform light reflected back through the waveguide and emitted from the one waveguide end into a corresponding electrical signal; and indicator means connected to receive such current pulse and electrical signal to provide an indication of the time lapse between emission of such light pulse and emission of amplified light resulting from reflection of the light of such pulse in the waveguide.

* * * * *